May 14, 1929.  H. WATKISS  1,712,597

AIR VALVE CAP

Filed Dec. 18, 1926

H. Watkiss.
INVENTOR.

BY Murray O. Hayes

ATTORNEY.

Patented May 14, 1929.

1,712,597

UNITED STATES PATENT OFFICE.

HORACE WATKISS, OF SALT LAKE CITY, UTAH.

AIR-VALVE CAP.

Application filed December 18, 1926. Serial No. 155,626.

This invention relates to a device which will serve the functions of both the dust cap and valve cap ordinarily used in air valves such as those of automobile tires, and has for its objects:

First. To provide thorough protection for the valve and the valve tube.

Second. To produce a device of the type named which shall be readily and quickly manipulated.

Third. To devise a cap which will not have to be removed completely to inflate the tire.

Fourth. To provide a cap having a valve wrench, but which can not be misplaced or lost.

These and other objects are achieved by the device set forth herein and shown in the drawings, wherein.

Figure 1:
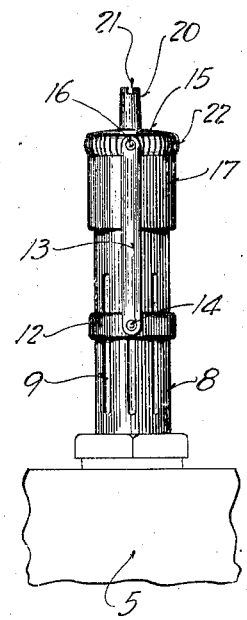
Fig. 1 is a side elevation of my device applied to a valve tube.

The numeral 5 designates a portion of a felloe through which projects the valve tube 6 of the pneumatic tire carried by the wheel of which said felloe forms a part; the contracted terminal portion 7 of said tube is threaded for the reception of the usual valve cap which is applied thereto to prevent loss of air in the event of leakage past the valve.

It is the usual practice to mount a leak preventing valve cap on portion 7 and then to mount over that a dust cap which also protects the valve tube 6; this entails the necessity of removing two caps every time air is put in the tire. There are also dust caps which are provided with rubber gaskets to act as leak preventives, but these are unsatisfactory owing to the varying length of valve tube exposed. Another disadvantage of the present types of caps is that they may be lost through failure to replace them on the valve tube, or they may easily be misplaced, neither of which mishaps can occur with my present invention.

The body portion of my device is designated by 8; this is formed of any suitable material, preferably non-corroding metal, and is provided with longitudinally extending ribs or grooves as shown at 9 to facilitate the screwing on or off of said member. Body 8 is provided with a female thread 10 at the end thereof which is to be disposed adjacent the free end of valve tube 6. On the exterior of the body 8, at the same end, is a flange 11, preferably rectangular in cross section, but it may be formed by expanding the tube at that place.

A collar 12 is mounted to be freely rotatable and slidable on body 8. At diametrically opposite parts of said collar arms 13 are pivotally secured by rivets 14. The other end of each arm is pivotally secured to cap 15; in the case illustrated a single rivet 16 is shown extending through said cap but obviously a separate securing means may be used for each arm.

Cap 15 is formed with a skirt 17 which has a snug, but not tight, fit with flange 11; by forming said skirt of sufficient length it permits of the use of various lengths of valve tube, as said skirt may extend to a greater or less degree beyond said flange 11, or the body 8 may be made of varying lengths and the said skirt kept the same length in all cases. The inside of said cap 15 is provided with a boss 18 which is internally threaded to engage contracted portion 7 of the valve tube; said boss may contain a rubber gasket 19 to insure an air tight seal of said tube, or may be formed with a ground seat. Said cap 15 is also provided with a portion 20 slotted at 21, to serve as a valve wrench. Cap 15 is milled as shown at 22 or the same part may be knurled to insure the friction requisite to affix said cap on, or detach it from, threaded portion 7.

Figure 3:
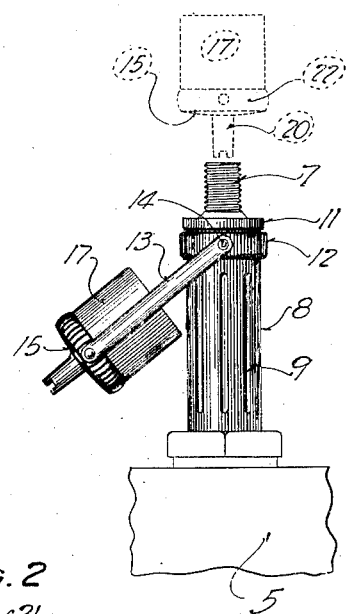
Fig. 3 is a view somewhat similar to Fig. 1 but with the valve cap portion swung aside, and also in dotted lines, in position to use the valve wrench.
Figure 2:
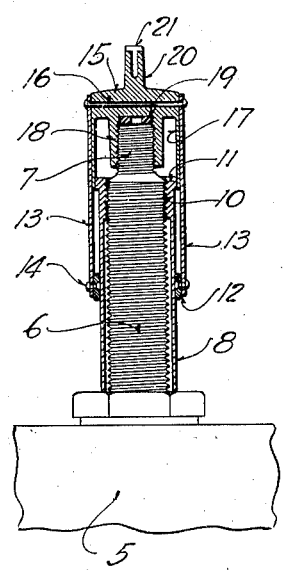
Fig. 2 is a longitudinal section thereof taken in the plane of the paper through Fig. 1.

Collar 12 is made rotatable on body 8 to permit of screwing cap 15 on and off; it is slidable thereon for the same purpose and for the further purpose of making it possible to swing cap 15 to one side as shown in Fig. 3 and also to invert said cap to utilize the valve wrench portion thereof, as shown in dotted lines in the same figure.

Placing threads 10 at the outer end of body 8, as shown, makes it possible to mount said body on the valve tube with a minimum of time and effort. Flange 11 not only aids in making a close fit between cap and body, but it retains collar 12 on the body and prevents loss and misplacement of cap 15. It is apparent that while I provide as great protection for the valve tube and as much surety against leakage of air as when two separate caps are employed, I have greatly diminished the time required for manipulation and have further insured the cap against loss or accidental misplacement.

As the threads in boss 18 are of different pitch from those of tube 6, the cap 15 and body 8 will act as locks for each other, so if one of them is properly screwed into place it will be impossible to lose either part; if the said cap be tightly set up on its threads the body 8 will lock against it in case said body becomes loose and works up on the tube, while so long as body 8 remains fast the cap can not lose because it is secured to body 8 through collar 12 and arms 13.

The threads in body 8 may be placed at either end thereof or extend its full length, but the arrangement shown makes for most rapid manipulation.

I claim:

1. In an air valve cap, the combination of a body portion provided with internal screw threads at that end thereof which is most distant from the tire when said cap is in operative position, an external flange on said body adjacent the aforementioned end thereof, a collar mounted to be freely movable on said body, arms pivotally secured to said collar, and a closure member which is also pivotally secured to said arms, the said closure member having an internally threaded boss and a skirt adapted to extend over said flange in snug fit therewith.

2. In an air valve cap, the combination of a body portion provided with internal screw threads at that end thereof which is most distant from the tire when said cap is in operative position, an external flange on said body adjacent the aforementioned end thereof, a collar mounted to be freely movable on said body, arms pivotally secured to said collar, and a closure member which is also pivotally secured to said arms, the said closure member having an internally threaded boss, a skirt adapted to extend over said flange in snug fit therewith, and a projecting member provided with a slot extending from that side of said closure member which is opposite said boss.

In witness whereof I affix my signature.

HORACE WATKISS.